US012586959B2

(12) United States Patent
Evans et al.

(10) Patent No.: US 12,586,959 B2
(45) Date of Patent: Mar. 24, 2026

(54) ANGLED CONNECTOR

(71) Applicant: TE Connectivity Solutions GmbH, Schaffhausen (CH)

(72) Inventors: Nicholas Lee Evans, Middletown, PA (US); Kevin Stauffer, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 454 days.

(21) Appl. No.: 18/165,658

(22) Filed: Feb. 7, 2023

(65) Prior Publication Data

US 2024/0266785 A1 Aug. 8, 2024

(51) Int. Cl.
*H01R 13/6582* (2011.01)
*H01R 43/048* (2006.01)
*H01R 43/20* (2006.01)

(52) U.S. Cl.
CPC ....... *H01R 13/6582* (2013.01); *H01R 43/048* (2013.01); *H01R 43/20* (2013.01)

(58) Field of Classification Search
CPC ............ H01R 13/6593; H01R 13/6582; H01R 43/048; H01R 43/20
USPC ........................................ 439/607.55, 607.56
See application file for complete search history.

(56) References Cited

U.S. PATENT DOCUMENTS 5,273,459 A * 12/1993 Davis ................. H01R 13/6593 439/607.48
5,409,400 A * 4/1995 Davis ..................... H01R 24/60 439/906
8,840,428 B2 * 9/2014 Omae .................. H01R 13/648 439/582
9,214,743 B2 12/2015 Duesterhoeft et al.
11,509,075 B2 11/2022 Smith et al.
11,870,198 B2 * 1/2024 Smith ................ H01R 13/5219
2015/0303622 A1 * 10/2015 Tao .................... H01R 13/6581 439/607.55
2015/0311602 A1 * 10/2015 Duesterhoeft ..... H01R 13/6593 439/817

FOREIGN PATENT DOCUMENTS

WO 2022004438 A1 1/2022
WO 2022238151 A1 11/2022

OTHER PUBLICATIONS

International Search Report, International App. No PCT/IB2024/050979 International Filing Date Feb. 2, 2024.

* cited by examiner

*Primary Examiner* — Gary F Paumen

(57) ABSTRACT

A connector comprises a shield, a contact and a dielectric. The shield includes a first section extending in a first direction and a second section extending from the first section at a bend angle in a second direction. The dielectric is arranged within the shield and defines a first section extending in the first direction and a second section extending from the first section at the bend angle in the second direction. The contact is wholly arranged within the dielectric and includes a connecting end adapted to connect to a cable and a mating end adapted to engage with a mating contact. The mating end extends in the first direction and the connecting end extends from the mating end at the bend angle in the second direction.

19 Claims, 9 Drawing Sheets

ANGLED CONNECTOR

FIELD OF THE INVENTION

The present disclosure relates to electrical connectors and, more particularly, to an angled subassembly and an associated angled connector.

BACKGROUND

An angled connector commonly includes a housing, contacts arranged within the housing, a shield disposed around the housing, and a cable disposed within the housing and electrically connected to the contacts. Angled connectors are used in applications in which the contacts of the connector are required to be oriented at an angle with respect to a direction in which the cable extends into the connector.

Current angled connector designs typically rely on a two-piece construction, with a connection interface between a cable and a contact occurring at the corner of the bend of the connector. These arrangements can lead to a loss of robustness due to additional interfaces in signal contacts and/or shielding, as well as difficult impedance control. Simplified designs which improve connector robustness and impedance control, as well as reduce the number of required components, are desired.

SUMMARY

A connector comprises a shield, a contact and a dielectric. The shield includes a first section extending in a first direction and a second section extending from the first section at a bend angle in a second direction. The dielectric is arranged within the shield and defines a first section extending in the first direction and a second section extending from the first section at the bend angle in the second direction. The contact is wholly arranged within the dielectric and includes a connecting end adapted to connect to a conductor of a cable, and a mating end adapted to engage with a mating contact. The mating end extends in the first direction and the connecting end extends from the mating end at the bend angle in the second direction.

BRIEF DESCRIPTION OF THE DRAWINGS

The invention will now be described by way of example with reference to the accompanying Figures, of which.

DETAILED DESCRIPTION OF THE EMBODIMENT(S)

Figure 2:
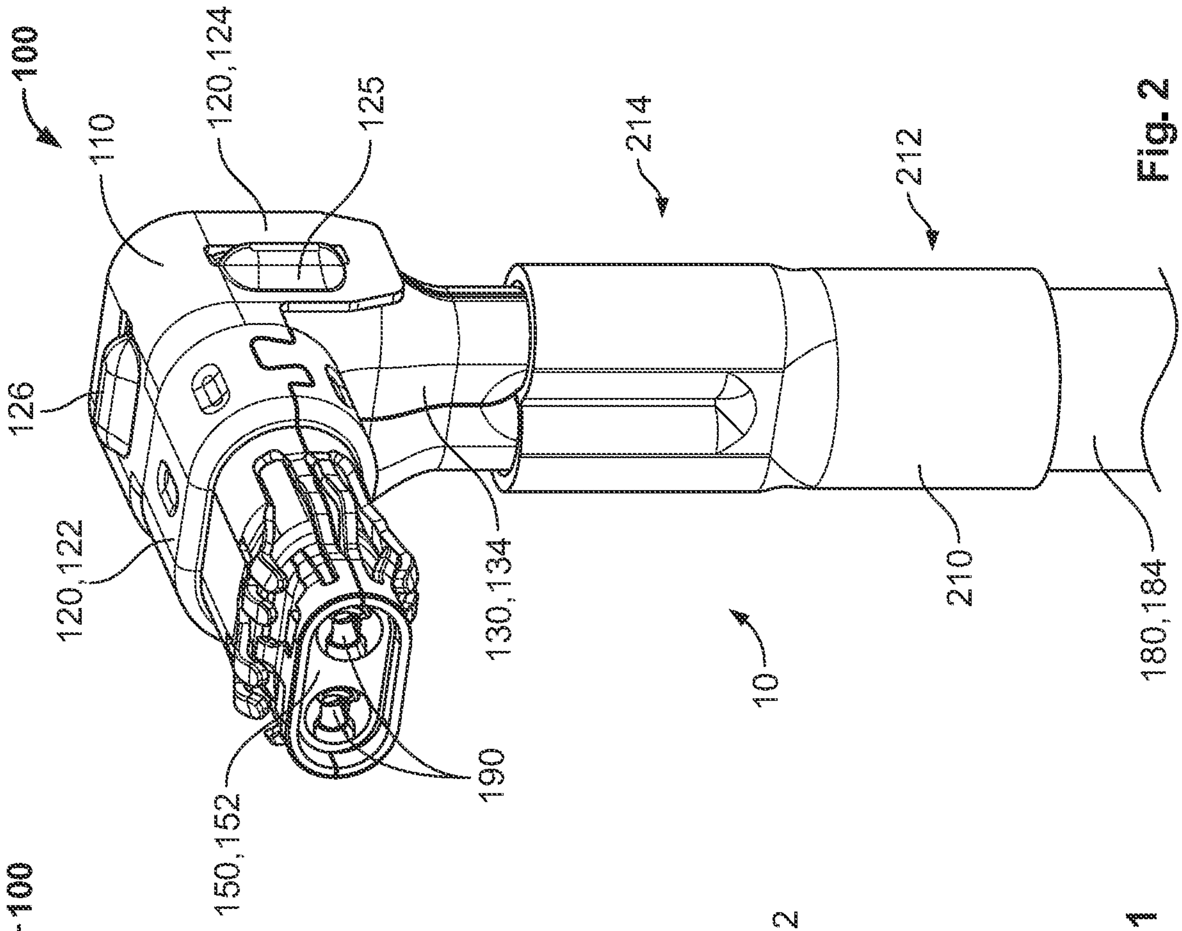
FIG. 2 is a front perspective view of the connector assembly of FIG. 1.

Exemplary embodiments of the present disclosure will be described hereinafter in detail with reference to the attached drawings, wherein like reference numerals refer to like elements. The present disclosure may however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Throughout the specification, directional descriptors are used such as “longitudinal”, “width”, and “vertical”. These descriptors are merely for clarity of the description and for differentiation of the various directions. These directional descriptors do not imply or require any particular orientation of the disclosed elements.

Throughout the drawings, only one of a plurality of identical elements may be labeled in a figure for clarity of the drawings, but the detailed description of the element herein applies equally to each of the identically appearing elements in the figure.

A connector assembly 10 according to an embodiment of the present disclosure is shown in FIGS. 1-4. The assembly 10 includes an angled connector or angled connector subassembly 100 and a cable 180 electrically connected thereto. The connector 100 includes an angled shield or shield assembly 110, an angled dielectric 150 disposed in the shield assembly 110, a pair of contacts 190 electrically connected to conductors of the cable 180, and an outer ferrule 210 disposed around the cable 180 and the angled shield assembly 110.

Figure 3:
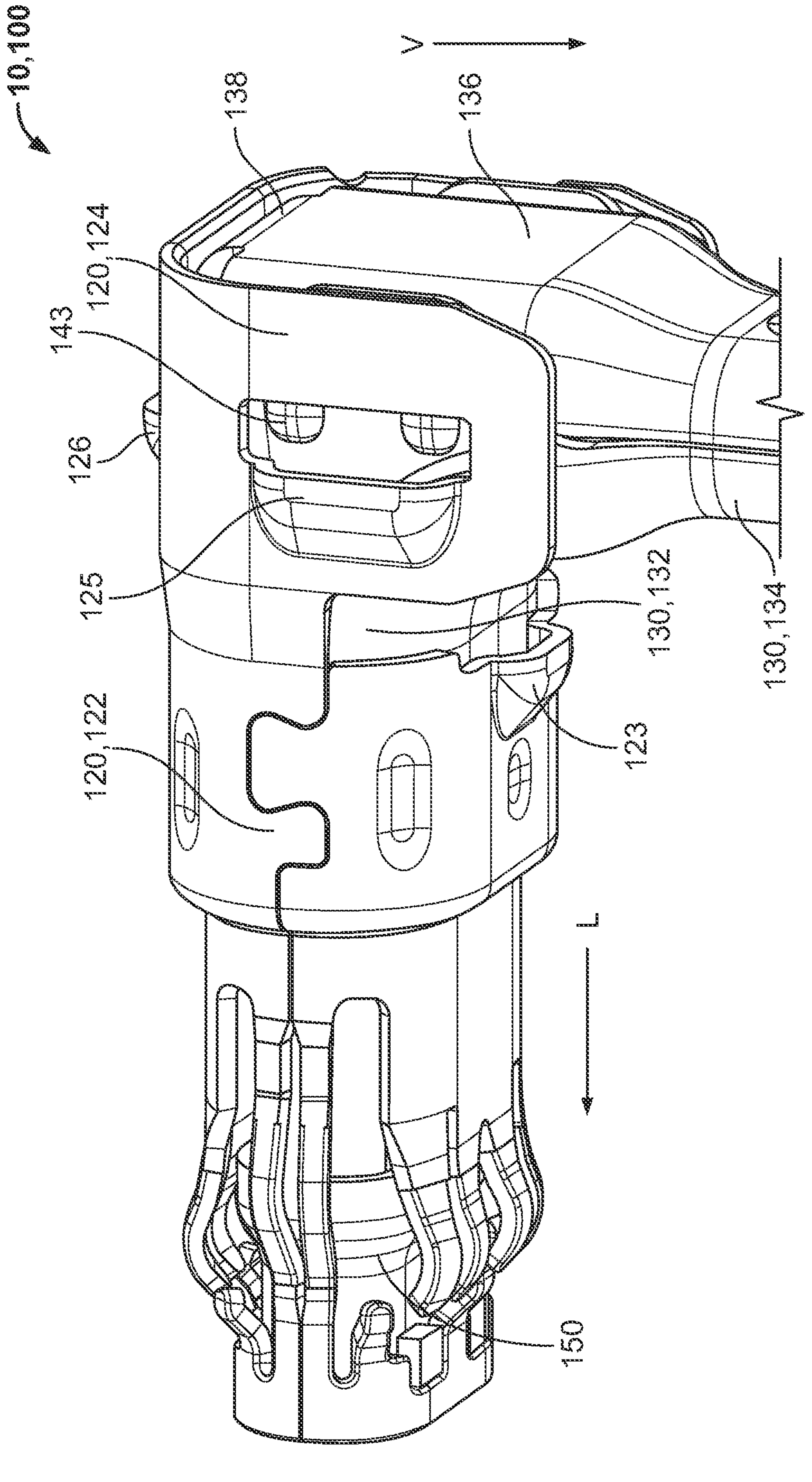
FIG. 3 is a partial side perspective view of the angled connector of the connector assembly of FIG. 1.
Figure 4:
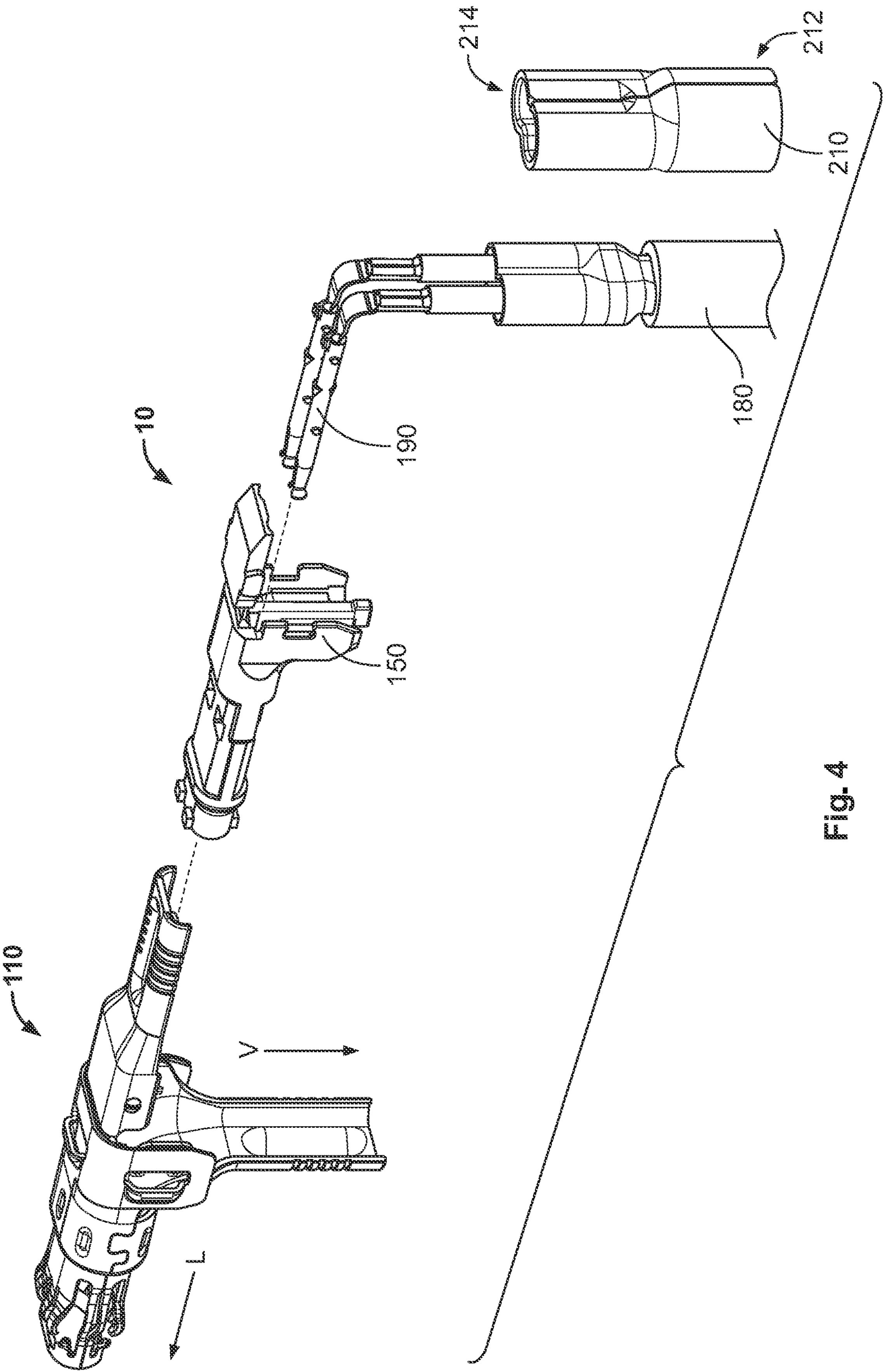
FIG. 4 is an exploded perspective view of the connector assembly of FIG. 1.
Figure 5:
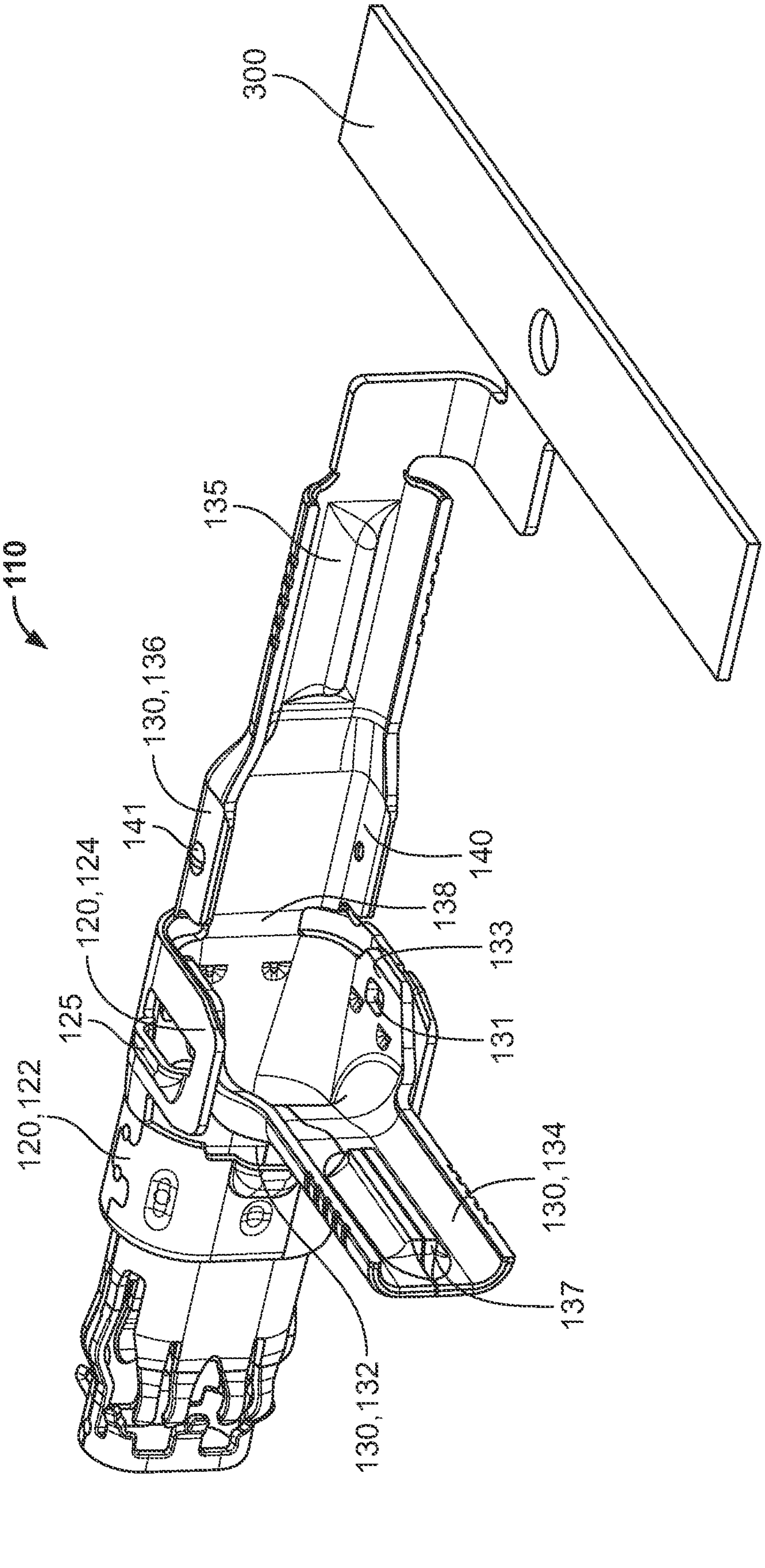
FIG. 5 is a bottom perspective view of a shield subassembly of the angled connector of FIG. 1.

As shown in FIGS. 3-5, for example, the angled shield or shield assembly 110 comprises a first or front shield 120 and a second or rear shield 130 extending from the front shield. The front shield 120 includes a first body section 122 extending along a longitudinal axis of the connector 100 in a first direction (i.e., a longitudinal direction L). The front shield 120 further includes a second body section 124 extending from the first body section 122 at a bend angle or second direction (i.e., a vertical direction V) relative to the first direction. In the exemplary embodiment, this angle is approximately 90°, however, the bend angle may be other non-zero angles without departing from the scope of the present disclosure. The first and second body sections 122,

124 of the front shield 120 are preferably formed monolithically, such as by stamping or forming sheet metal.

The second body section 124 of the front shield 120 defines laterally extending locking surfaces 125, as well as a vertically extending locking surface 126. Additional locking surfaces 123 may be formed on the first body section 122. These protruding latches may serve to secure, for example, a cover to the shield during further processing, or secure the connector 100 in an inserted position relative to another component.

The rear shield 130 includes a first body section 132 extending along the longitudinal direction L or first direction of the connector 100, and a second body section 134 extending from the first body section at approximately the bend angle. Like the front shield 120, the first and second rear body sections 132,134 may be formed from a single piece of stamped sheet metal, by way of example. As shown most clearly in FIG. 3, with the shield cover 136 in the closed position, the front shield 120 extends to the rearward most end of the shield assembly 110. More particularly, at least the front shield 120, including the second body section 124, overlaps or covers at least portions of both the first and second rear body sections 132,134. This rearward extension of a front shield 120 is a departure from the prior art, and improves connector shielding due to the overlapped components.

The rear shield 130 further comprises a shield cover 136. The cover 136 is attached to a remainder of the rear shield 130 at a shield hinge 138. The shield cover 136 is pivotable with respect to the remainder of the rear shield 130 about the shield hinge 138 between an open shield position, shown in FIGS. 4, 5 and 10, and a closed shield position shown in FIGS. 1-3 and 11-13. In the closed position, the shield cover 136 forms part of the second rear body section 134 and extends from the first rear body section 132 at the bend angle in the vertical direction V. As shown in FIG. 3, detents 143 may be formed on or defined by the rear shield 130 and engage with the second body section 124 of the front shield 120 for securing the front and rear shields together. The detents 143 further serve to provide additional points of contact, improving EMI/shielding performance of the shield assembly 110.

As shown in FIG. 5, the cover 136 defines protruding flanges 140 on each lateral side. Detents 141 have been formed (e.g., stamped) into the flanges 140. Corresponding recesses or openings 131 are formed through the rear shield 130, and act as latches with the detents functioning as catches to selectively hold the shield cover 136 in the closed position. It should be understood that the reverse arrangement may also be utilized, as well as differing numbers of detents and latches, without departing from the scope of the present disclosure. In the exemplary embodiment, the openings 131 are formed on tabs 133 extending from a rear of the rear shield 130, although other locations are possible.

Still referring to FIG. 5, both the second body section 134 and the shield cover 136 define respective ridge-like protrusions 135,137. Each protrusion 135,137 extends generally at the bend angle with the cover in the closed position, and acts to maintain separation of the wires of the cable 180 and/or the contacts 190 in an assembled state of the connector 100. The protrusions 135,137 also provide support during the crimping of the outer ferrule 210, in lieu of an inner ferrule used in the prior art, and prevent excess deformation (i.e., crushing) of the rear shield 130 and the cable 180 and/or contacts 190. In the embodiment shown in FIG. 5, an end of the cover 136 of the rear shield 130 is connected to a carrier strip 300. A plurality of rear shields 130 can be connected to the carrier strip 300 to move the shields 130 during production or for other applications. Prior to use of the rear shield 130 as described below, the carrier strip 130 is removed, as would be understood by one of ordinary skill in the art.

As described above, the angled shield assembly 110 of the exemplary embodiment is formed of two components (i.e., front and rear shields) which are fixed together after production by, for example, crimping and/or welding. The components of the angled shield assembly 110 are formed of a conductive material, such as aluminum. The angled shield assembly 110 may be formed by stamping and bending sheet metal. In other embodiments, the shield assembly 110 may be monolithically formed.

Figure 6:
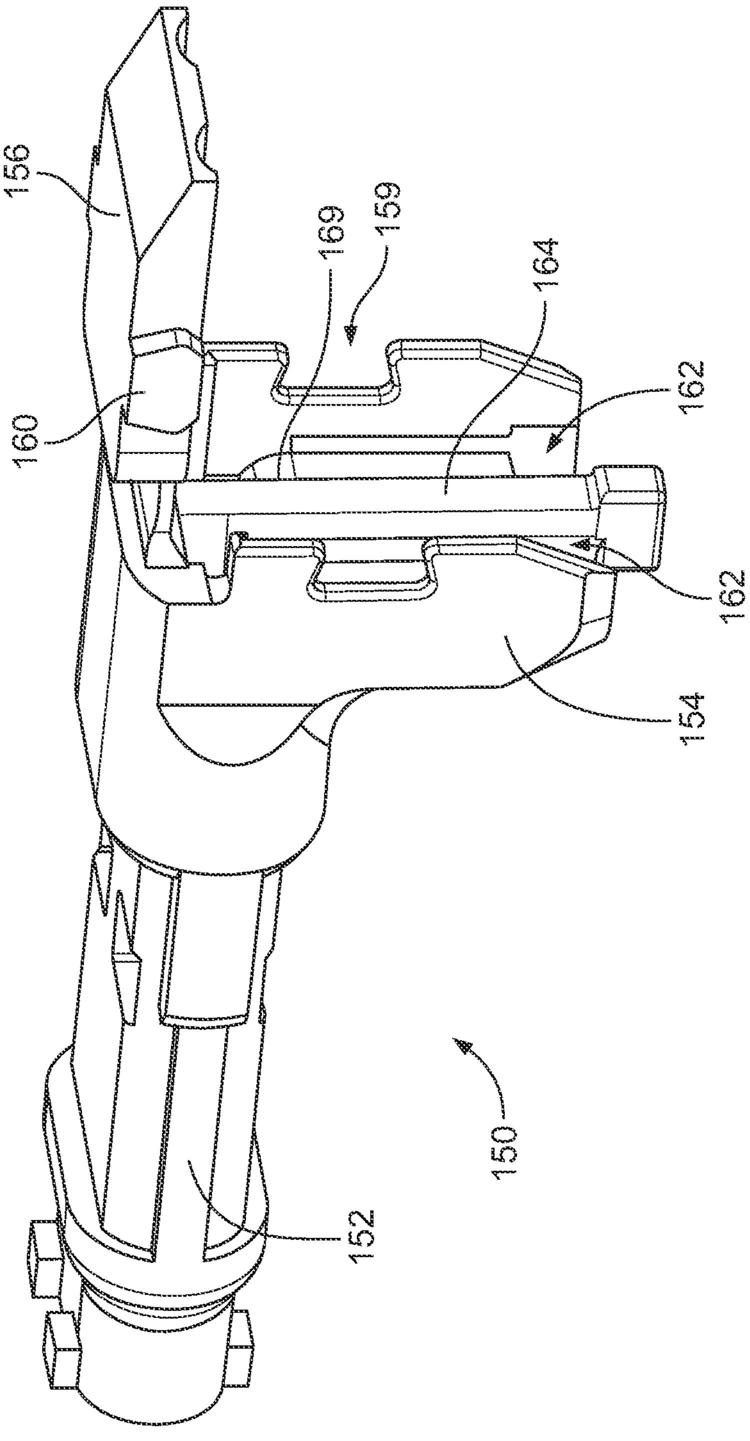
FIG. 6 is a perspective view of a dielectric of the angled connector of FIG. 1.

The angled dielectric 150, as shown in FIGS. 4, 6, 9 and 13, has a body consisting of a first dielectric section 152 and a second dielectric section 154. The first dielectric section 152 has a longitudinal axis extending generally in the first or longitudinal direction L in an assembled state of the connector 100. The second dielectric section 154 extends from the first dielectric section 152 generally at the bend angle or perpendicularly therefrom in the vertical direction V. As with the shield assembly 110, the bend angle of the second dielectric section 154 relative to the first dielectric section 152 may be altered in other embodiments of the present disclosure. As shown in FIG. 6, the angled dielectric 150 has a dielectric cover 156 attached thereto at a dielectric hinge 158. The dielectric cover 156 is pivotable with respect to a remainder of the body of the dielectric 150 about the dielectric hinge 158 between an open position, shown in FIGS. 4 and 6, and a closed position, shown in FIGS. 9, 10 and 13.

In the embodiment shown in FIG. 6, the dielectric 150 has a dielectric catch 159 formed in the second dielectric section 154 and the dielectric cover 156 defines a dielectric latch 160. When the dielectric cover 156 is pivoted into the closed dielectric position, the dielectric latch 160 engages with the dielectric catch 159 and secures the dielectric cover 156 in the closed position. In the exemplary embodiment, the dielectric catch 159 is a recess and the dielectric latch 160 is a protrusion complementary to the recess of the dielectric catch. In other embodiments, the position of the catch 159 and latch 160 may be reversed compared to the arrangement shown, or the dielectric catch and the dielectric latch may substituted with any other elements capable of engaging with one another to secure the dielectric cover 156 in the closed dielectric position. In another embodiment, the dielectric catch 159 and the dielectric latch 160 may be omitted entirely, and the dielectric cover 156 may be held closed by, for example, a friction fit.

Figure 13:
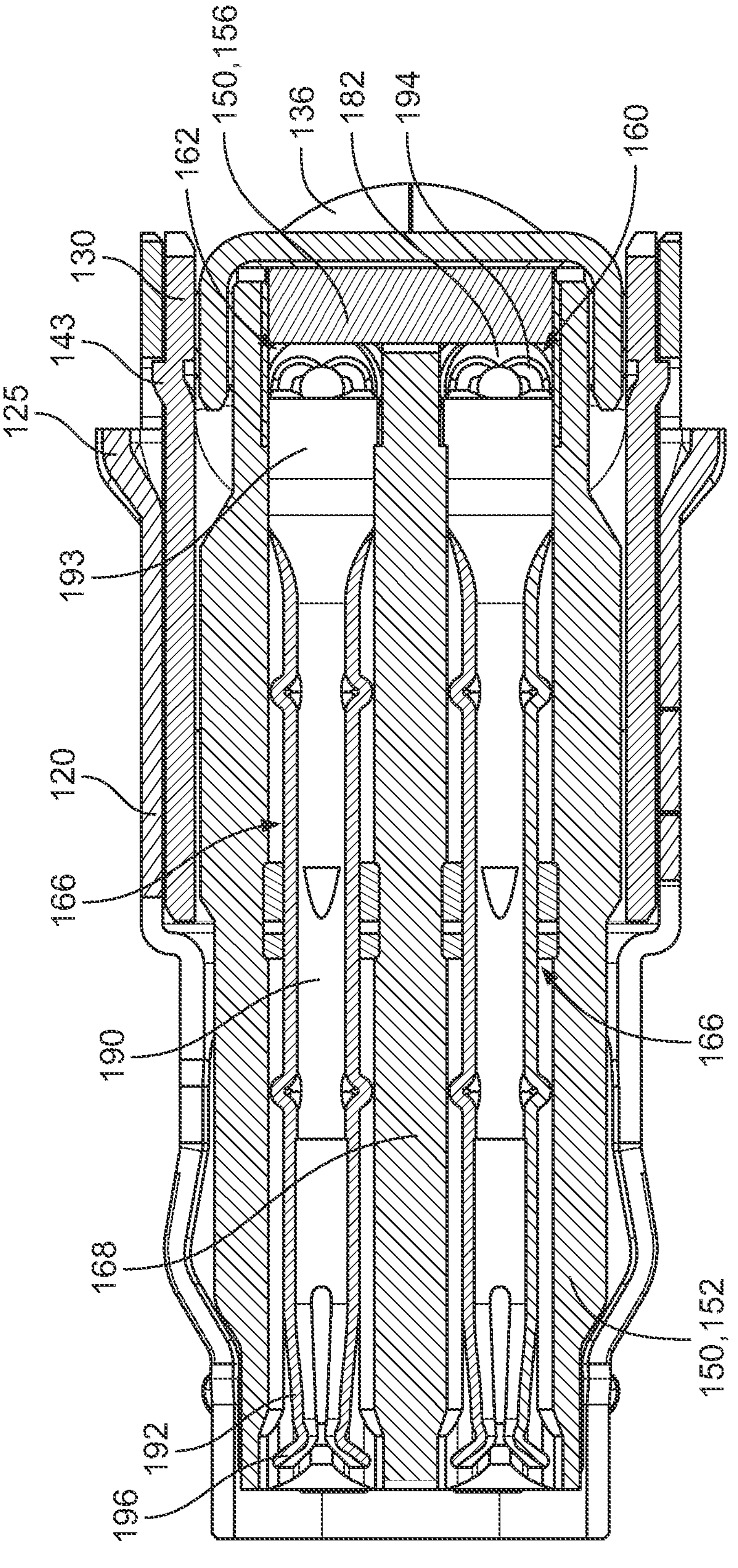
FIG. 13 is a sectional top view of the connector assembly of FIG. 1.

Still referring to FIG. 6, the second dielectric section 154 defines two channel-like recesses 162 divided by an elongated protrusion 164. The recesses 162 are sized to receive portions of the pair of contacts 190, as can be seen in FIG. 13. Likewise, the first dielectric section 152 defines two enclosed, elongated terminal openings or passageways 166 divided or separated by a wall 168. The terminal passageways 166 are sized and shaped to retain the remaining portions of the pair of contacts 190, including their mating ends. A rounded transition 169 between each of the recesses 162 and passageways 166 may comprise a radius matching that of bent portions 193 of the contacts 190, as shown in FIGS. 6 and 8.

Figure 9:
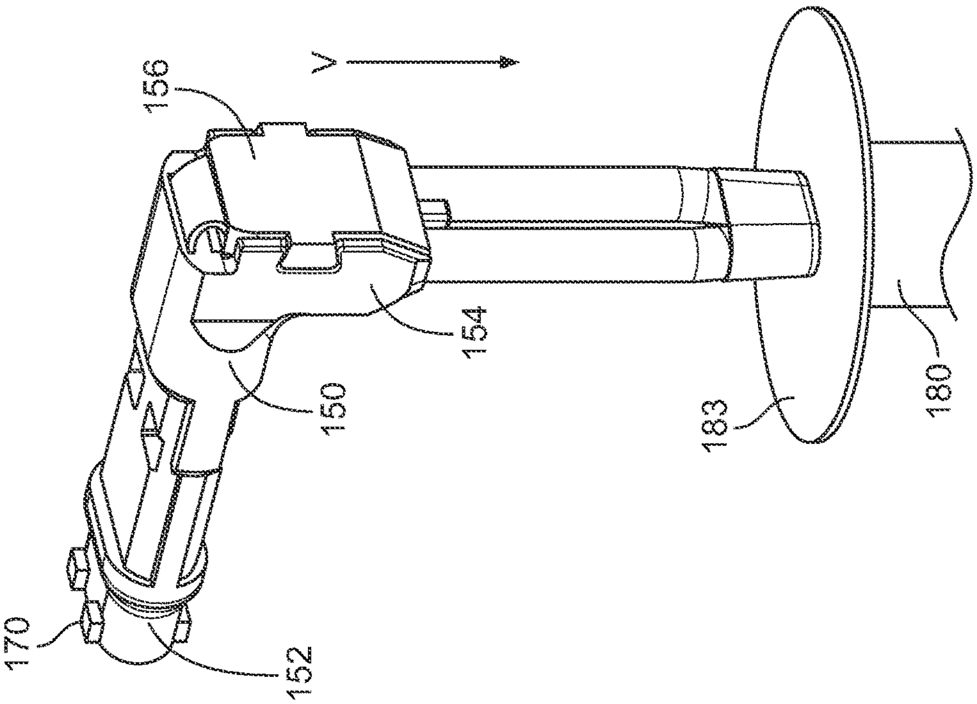
FIG. 9 is a perspective view of the cable and the angled dielectric of FIGS. 6 and 8 with a dielectric cover in a closed dielectric position.

As shown in FIGS. 2, 9 and 13, the first dielectric section 152 extends beyond a mating end or portion 192 of each contact 190 in the longitudinal direction L, and the second dielectric section 154 extends beyond a connecting (or crimping) end 194 of each contact 190. In this way, the dielectric 150 covers or houses the contacts 190 continuously over their entire lengths. This is an improvement over embodiments of the prior art. Moreover, the dielectric 150 receives only the contacts 190 therein. Specifically, as the wire-to-contact connection is made prior to the bend the connector 100, no inner ferrule is necessary to support the wires of the cable 190 before, after, or through the bent portion 193 of the contact 190.

The angled dielectric 150 is manufactured from a dielectric material, such as a plastic, and in an embodiment is monolithically formed in a single piece with at least the first dielectric section 152, the second dielectric section 154, and the dielectric cover 156. In the illustrated embodiment, the dielectric hinge 158 is a film hinge. In other embodiments, the angled dielectric 150 may be formed from a plurality of separate elements attached together.

Figure 8:
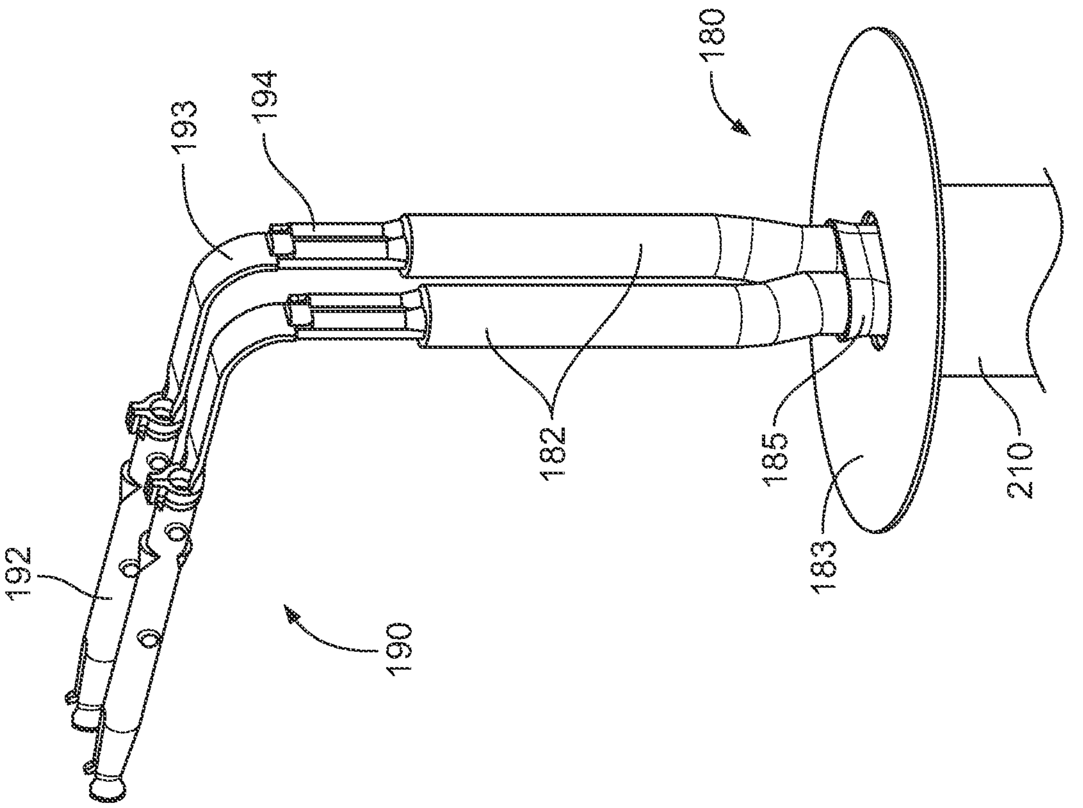
FIG. 8 is a perspective view of a cable of the connector assembly of FIG. 1 connected to contacts of the angled connector.

The cable 180, as shown most clearly in FIG. 8, includes a pair of wires 182, a braid 183 disposed around the wires, and a cable insulation 184 disposed around the braid 183. In embodiments, the cable 180 may be a twisted pair cable, by way of example only. The braid 183 is formed of a conductive material. The cable insulation 184, formed of an insulating material, is disposed around and in abutment with the braid 183.

Each of the contacts 190, as shown in in FIGS. 8 and 13, include the mating portion 192, the bent portion 193 and the connection or connecting portion 194 at an end opposite the mating portion 192. The contact 190 is formed of a conductive material. In the exemplary embodiment, the mating portion 192 is a receptacle for a pin, and more specifically a receptacle defining a split lead-in 196. In other embodiments, the mating portion 192 could be a pin or any other type of contact element capable of mating with another contact element. In the shown embodiment, the connection portion 194 is a crimping portion having crimp wings capable of being crimped to a conductor. In other embodiments, the connection portion 194 could be a flat element capable of being welded to a conductor, or any other type of element capable of mechanically and electrically connecting the contact 190 to a conductor. The bent portion 193 of the contact 190 comprises a generally flat section of the contact material which has been bent about a single axis to achieve a desired bend angle (e.g., 90°. The connector 100 has two contacts 190 in the exemplary embodiment. The number of contacts 190 corresponds to the number of wires 182 of the cable 180. The angled subassembly 100 may alternatively have one contact 190 for an embodiment of the cable 180 having one wire 182.

Figure 7:
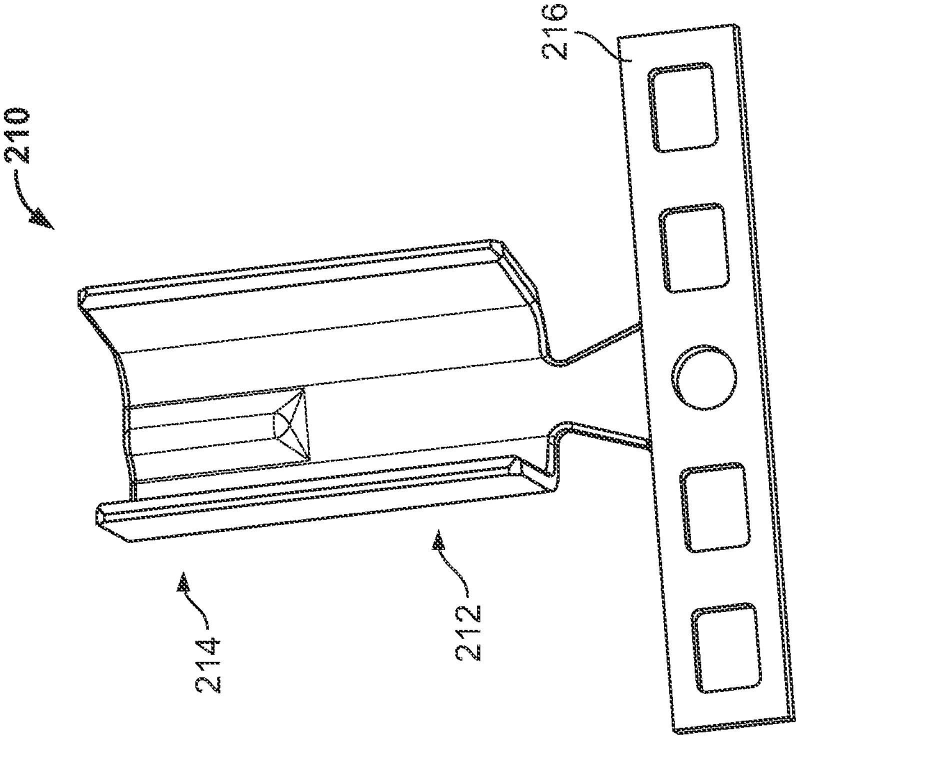
FIG. 7 is a perspective view of an outer ferrule of the connector assembly of FIG. 1 in an uncrimped state.

The crimpable outer ferrule 210 is shown FIGS. 1, 2, 4 and 7. In its final state, the ferrule 210 has been crimped to form a generally cylindrical section 212 about the cable 180, and a formed section 214 which takes on the outer contour of the second rear body section 134 of the rear shield 130. The outer ferrule 210 is formed of a conductive material. In an embodiment, the outer ferrule 210 is formed from bending or rolling a sheet of conductive material. The uncrimped form of the outer ferrule 210 is shown in FIG. 7. A plurality of outer ferrules 210 can be connected to the carrier strip 216 to move the outer ferrules 210 during production or for other applications and, prior to use of the outer ferrule 210 as described below, the outer ferrule 210 is separated from the carrier strip 216.

Assembly of the angled connector 100 will now be described primarily with respect to FIGS. 1 and 8-12. Referring to FIG. 8, the cable 180 is shown having been prepared by stripping the cable insulation or outer jacket 184, the braid 183 and foil 185 to expose the wires 182. For each of the wires 182, a portion of the its insulation has been stripped to expose a portion of its conductor. The connecting portion 194 of each of the contacts 190 has been electrically and mechanically connected to one of the exposed conductors (e.g., via the illustrated crimps) of each of the wires 182. After the contacts 190 have been connected to the wires 182, the contacts 190 are bent to the desired bend angle in the flat area defined between the mating and connecting ends 192, 194 to form the bent portion 193.

In a following step, as shown in FIG. 9, the contacts 190 are inserted into the angled dielectric 150 in the first or longitudinal direction L with the dielectric cover 156 in the open dielectric position (not shown). Subsequently, the cover 156 is closed, resulting in the intermediate configuration shown in FIG. 9. It is noted that the dielectric 150 extends in the downward/vertical direction V at least to the point of connection between the connection portions 194 and the wires 182, or past a location at which the insulation of the wires 182 has been stripped.

Figure 10:
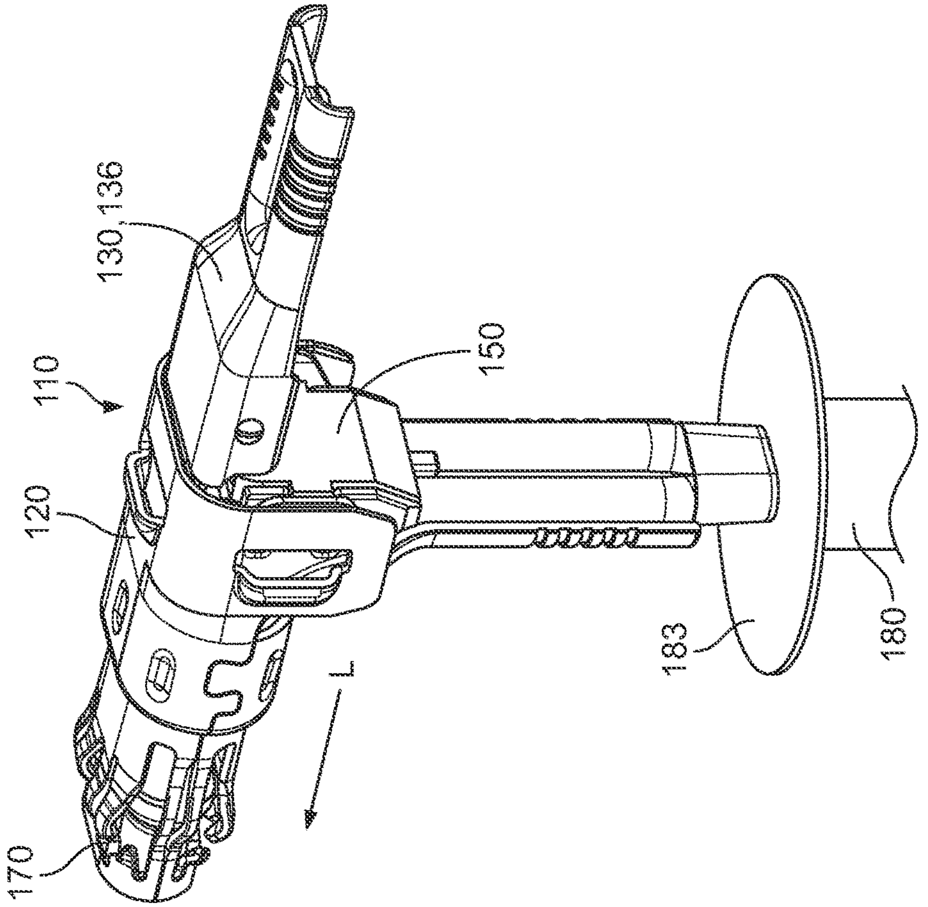
FIG. 10 is a perspective view of the connector assembly including the cable and the angled dielectric inserted into the shield subassembly with a shield cover of the shield subassembly in an open position.

Referring to FIG. 10, the front shield 120 has been preassembled with the rear shield 130 to form the shield assembly. The preassembled shield assembly 110 is fitted over the dielectric 150. More specifically, with the cover 136 of the rear shield 130 in the open position, the dielectric 150 and the contacts 190 are inserted into the shield assembly 110 in the longitudinal direction L of the assembly. A depth of insertion of the dielectric 150 into the shield 110 may be set by a number of features, including protruding mechanical stops 170 formed on the end of the dielectric 150, as shown in FIGS. 9 and 10.

Figure 11:
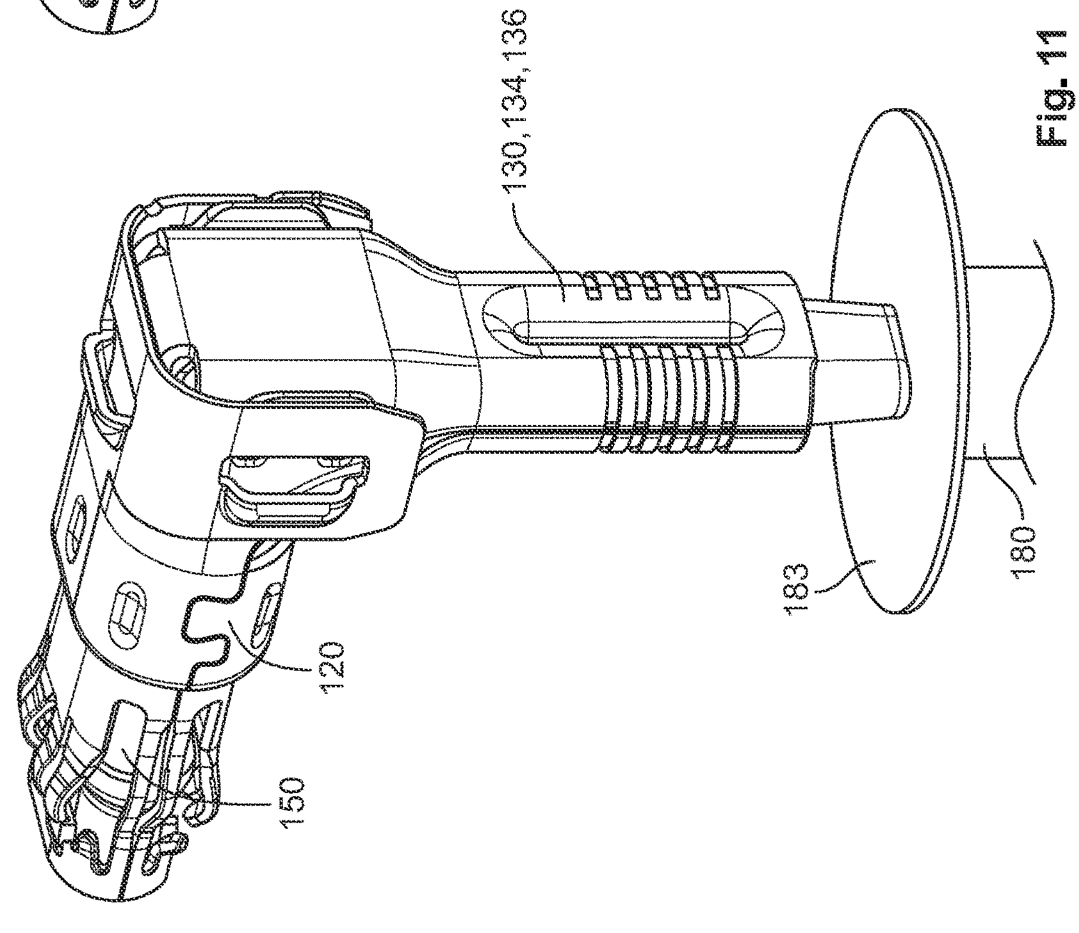
FIG. 11 is a perspective view of the connector assembly of FIG. 10 with the shield cover in a closed position and a braid of the cable in an undressed or flared state.

Referring to FIG. 11, the shield cover 136 is moved from the open shield position to the closed shield position, enclosing dielectric 150 and contacts 190 within the shield assembly 110. The cover 136 is retained in the closed position via the above-described detents, by way of non-limiting example. In other embodiments, in addition to or in lieu of engagement of the latch and catch arrangement, the shield cover 136 can be welded or otherwise joined in the closed shield position. At this stage the braid 183 is flared outwards from the cable 180.

Figure 1:
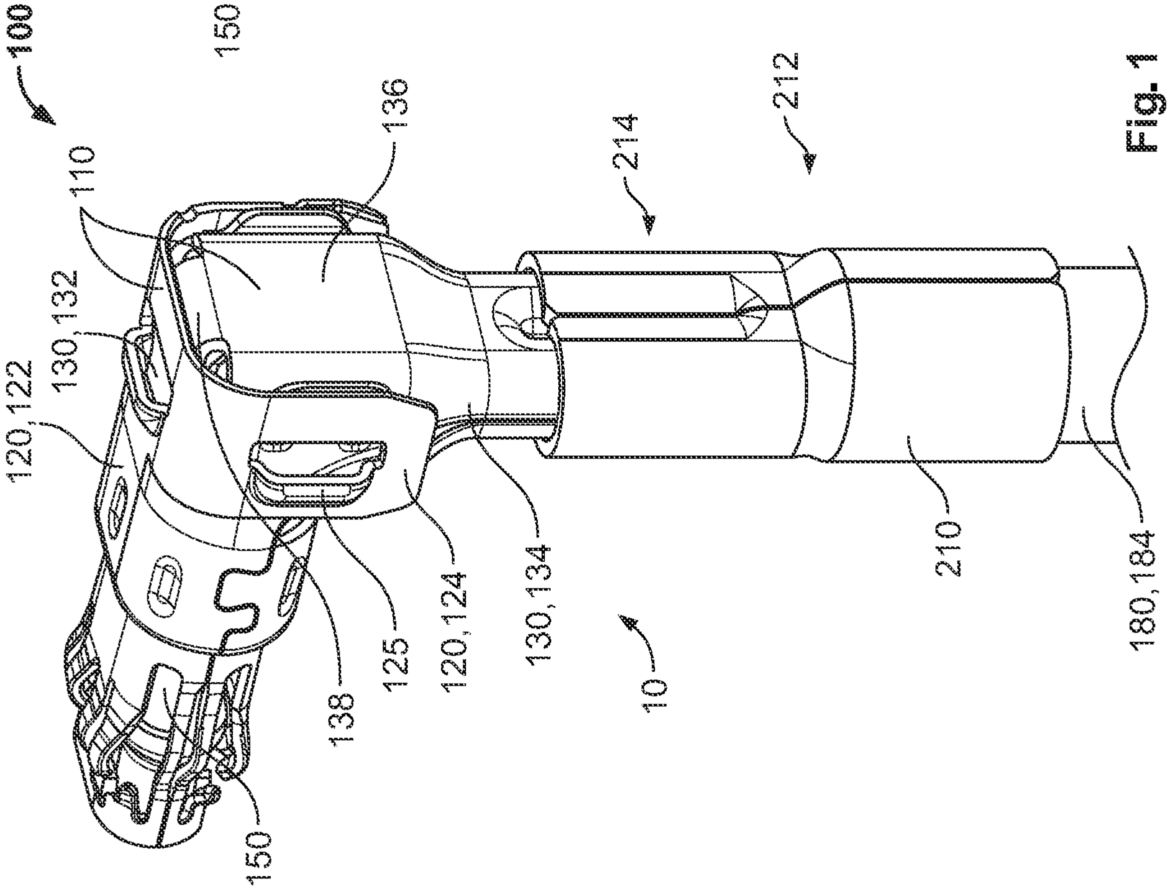
FIG. 1 is a rear perspective view of a connector assembly including an angled connector according to an embodiment of the present disclosure.
Figure 12:
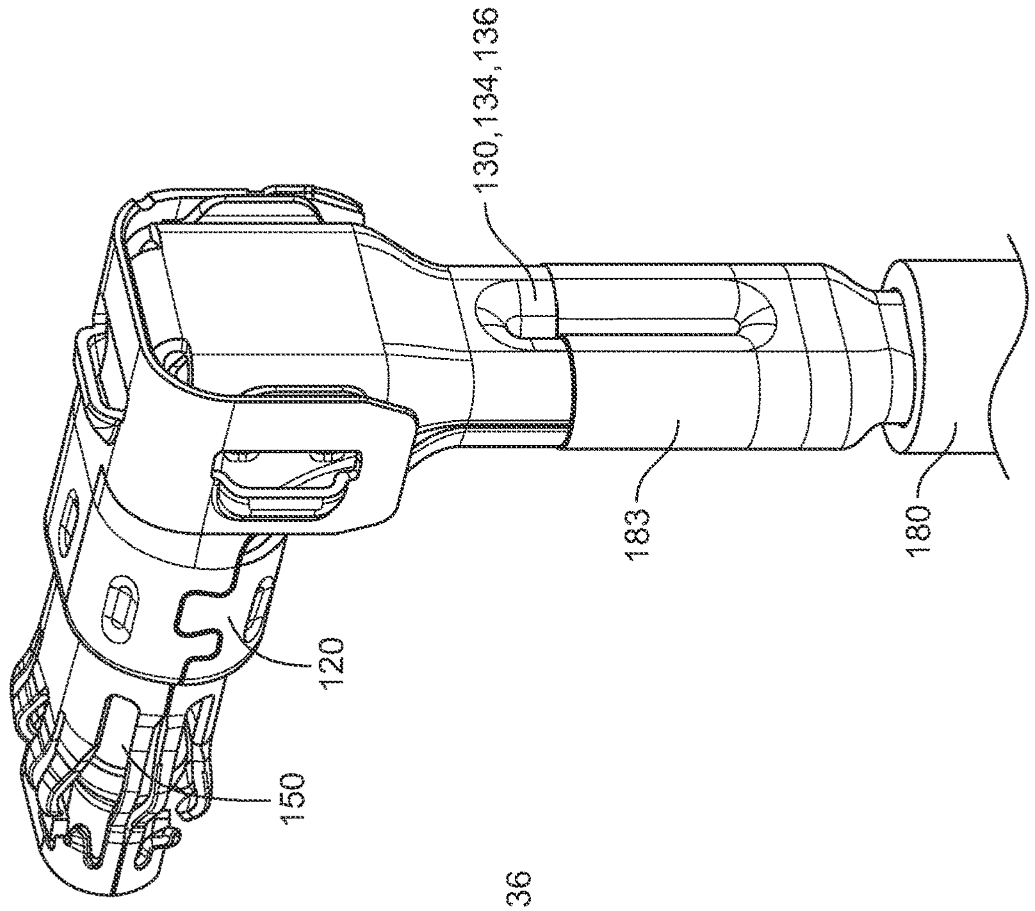
FIG. 12 is a perspective view of the connector assembly shown in FIG. 11 with the braid of the cable disposed over a first shield section of the shield subassembly.

With the shield cover 136 in the closed shield position shown in FIG. 11, the braid 183 is able to be dressed or folded over the second body section shield 134 of the angled shield assembly 110, as shown in FIG. 12. The outer ferrule 210 is then positioned over the exposed portion of the braid 183 and a portion of the cable insulation 184 and crimped over the braid, the second shield body section 134, and the cable insulation 184, as shown in FIGS. 1 and 2. The angled connector assembly 10 is shown in a fully assembled state in FIGS. 1-3.

It should be understood that embodiments of the present disclosure may be used for many types of wire or cable beyond the above-described flat flexible cables. By way of example, embodiments are also useful for flat printed cables (FPCs), or even variants of round-wire cable, without departing from the scope of the present disclosure.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word “a” or “an” should be understood as not excluding plural of said elements or steps, unless such exclusion is explicitly stated. Furthermore, references to “one embodiment” of the present disclosure are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

What is claimed is:

1. An angled connector, comprising:
a shield assembly, including:
a front shield having a first body section extending in a first direction; and
a rear shield fixed to the front shield, including:
a first rear body section extending in the first direction;
a second rear body section extending from the first rear body section at a bend angle with respect to the first direction, the front shield covering at least portions of the first and second rear body sections of the rear shield; and
a cover pivotable between an open position in which a contact is insertable into the shield assembly and a closed position in which the contact is enclosed within the shield assembly; and
an outer ferrule disposed around the second rear body section and the cover of the rear shield.

2. The angled connector of claim 1, wherein the front shield further includes a second body section extending from the first body section at the bend angle.

3. The angled connector of claim 2, wherein the second body section of the front shield defines locking surfaces protruding from lateral side thereof in a direction away from the rear shield.

4. The angled connector of claim 1, wherein the rear shield has a latch and the cover defines at least one detent for selectively engaging with the latch to secure the cover in the closed position.

5. The angled connector of claim 1, further comprising an angled dielectric disposed within the shield assembly.

6. The angled connector of claim 5, wherein the angled dielectric includes:
a first dielectric section extending in the first direction at least partially through the first rear body section of the rear shield and into the first body section of the front shield; and
a second dielectric section extending from the first dielectric section at the bend angle.

7. The angled connector of claim 6, further comprising at least one contact having a connecting portion adapted to connect to a cable and a mating portion adapted to engage with a mating contact, the mating portion extending in the first direction and the connecting portion extending from the mating portion at the bend angle.

8. The angled connector of claim 7, wherein the angled dielectric covers the at least one contact over its length.

9. The angled connector of claim 7, wherein the at least one contact includes a pair of contacts connected to a two-wire cable.

10. A connector, comprising:
a shield having a first section extending in a first direction and a second section extending from the first section at a bend angle in a second direction;
a dielectric arranged within the shield and having a first section extending in the first direction and a second section extending from the first section at the bend angle in the second direction; and
a contact entirely arranged within the dielectric and having a connecting end adapted to connect to a cable and a mating end adapted to engage with a mating contact, the connecting end includes crimp wings, the mating end extending in the first direction and the connecting end extending from the mating end at the bend angle in the second direction.

11. The connector of claim 10, wherein:
the first section of the dielectric extends beyond the mating end of the contact in the first direction; and
the second section of the dielectric extends beyond the connecting end of the contact in the second direction.

12. The connector of claim 10, wherein:
the mating end of the contact includes a socket having a split lead-in;
the mating end of the contact includes crimp wings; and
an intermediate portion of the contact forms the bend angle between the connecting end and the mating end.

13. The connector of claim 10, wherein the dielectric comprises a monolithic component.

14. The connector of claim 10, wherein the shield includes:
a front shield having a first body section extending in the first direction; and
a rear shield fixed to the front shield, including:
a first rear body section extending in the first direction; and
a second rear body section extending from the first rear body second at the bend angle in the second direction, the front shield covering at least portions of the first and second rear body sections of the rear shield.

15. The connector of claim 14, wherein the front shield further includes a second body section extending from the first body section at the bend angle in the second direction and at least partially covering the second rear body section.

16. A method of assembling an angled connector, comprising:
providing a cable having a wire;
crimping a contact onto the wire;
after the step of crimping the contact, bending the contact;
inserting the bent contact into a dielectric, the dielectric covering the contact over its complete length;
inserting the dielectric into a shield; and
crimping an outer ferrule onto the cable and the shield.

17. The method of claim 16, wherein the step of bending the contact includes creating a bend at a bend angle between a connection portion of the contact and the crimped wire.

18. The method of claim 16, further comprising the step of forming the shield, including:
forming a front shield having a first body section extending in a first direction;
forming a rear shield including a first rear body section extending in the first direction, and a second rear body section extending from the first rear body second at the bend angle, the front shield covering at least portions of the first and second rear body sections of the rear shield; and
prior to the step of inserting the dielectric into the shield, fixing the front shield to the rear shield via at least one of crimping or welding.

19. An angled connector, comprising:

a shield assembly, including:

a front shield having a first body section extending in a first direction; and a rear shield fixed to the front shield, including:

a first rear body section extending in the first direction; and a second rear body section extending from the first rear body section at a bend angle with respect to the first direction, the front shield covering at least portions of the first and second rear body sections of the rear shield; and a pair of contacts, each contact having a connecting portion adapted to connect to a cable and a mating portion adapted to engage with a mating contact.

* * * * *